US012746517B2

(12) United States Patent
Peng et al.

(10) Patent No.: US 12,746,517 B2
(45) Date of Patent: Sep. 29, 2026

(54) MINERAL SPRING GENERATOR

(71) Applicant: National Taipei University of Technology, Taipei City (TW)

(72) Inventors: Chi-Chuan Peng, Taipei City (TW); Chen-Ching Ting, Taipei City (TW); Tzu-Chiao Lin, Taipei City (TW); Ho Chang, New Taipei City (TW)

(73) Assignee: NATIONAL TAIPEI UNIVERSITY OF TECHNOLOGY, Taipei City (TW)

( * ) Notice: Subject to any disclaimer, the term of this patent is extended or adjusted under 35 U.S.C. 154(b) by 602 days.

(21) Appl. No.: 18/221,759

(22) Filed: Jul. 13, 2023

(65) Prior Publication Data

US 2024/0017221 A1 Jan. 18, 2024

(30) Foreign Application Priority Data

Jul. 15, 2022 (TW) ................................ 111126705

(51) Int. Cl.
*B01F 23/00* (2022.01)
*B01F 23/40* (2022.01)
*B01F 23/451* (2022.01)
*B01F 25/31* (2022.01)
*B01F 35/221* (2022.01)
(Continued)

(52) U.S. Cl.
CPC .......... *B01F 23/483* (2022.01); *B01F 23/451* (2022.01); *B01F 25/31* (2022.01); *B01F 35/22162* (2022.01); *B01F 35/718* (2022.01); *B01F 35/718051* (2022.01); *B01F 2101/48* (2022.01)

(58) Field of Classification Search
CPC .. B01F 23/483; B01F 2101/48; B01F 35/718; B01F 23/451; B01F 35/22162; B01F 35/718051; B67D 1/004; B67D 1/0014
See application file for complete search history.

(56) References Cited

U.S. PATENT DOCUMENTS

2019/0059633 A1* 2/2019 Bhutani ............... B67D 1/0068
2019/0152757 A1* 5/2019 Bissen .................... C02F 1/685

FOREIGN PATENT DOCUMENTS

CN 215334633 U * 12/2021
TW 201010687 A 3/2010

OTHER PUBLICATIONS

CN215334633U to Zhu, machine translation (Year: 2021).*

* cited by examiner

*Primary Examiner* — Anshu Bhatia
(74) *Attorney, Agent, or Firm* — Birch, Stewart, Kolasch & Birch, LLP

(57) ABSTRACT

A mineral spring generator has a machine body and a pipeline disposed in the machine body. Two ends of the pipeline respectively have a water inlet and a water outlet. A solenoid valve is connected between the pipeline. At least two injection channels are connected to the pipeline at intervals along a direction of a water flow in the pipeline. A micromotor is connected between each of the at least two injection channels. An outer end of each of the at least two injection channels is connected to a material container. Each material container is adapted to be filled with a liquid mineral spring concentrate. When the present invention is used, water is inputted through the water inlet, and the solenoid valve and the micromotors are activated to add the mineral spring concentrates in the at least two material containers to different positions of the pipeline.

20 Claims, 9 Drawing Sheets

(51) Int. Cl.

| | |
|---|---|
| ***B01F 35/71*** | (2022.01) |
| *B01F 101/48* | (2022.01) |

MINERAL SPRING GENERATOR

BACKGROUND OF THE INVENTION

Technical Field

The present invention relates generally to a device adapted to change a water quality, and more particularly to a mineral spring generator.

Description of Related Art

Existing hot springs gradually drains away and the development of natural hot springs is difficult, but the need of the hot springs in domestic use, hotels, public baths, rehabilitation centers, etc., is large. Therefore, there is a mineral spring concentrate available in the market, wherein the mineral spring could be provided by adding the mineral spring concentrate into a bath. Apart from the mineral spring concentrate, there are devices for adjusting the mineral spring concentrate and adding the mineral spring concentrate into a water source. For example, the Taiwan invention patent application No. TW097133523 discloses a hot spring generator, wherein a hot water inputted is divided into two portions. One of the two portions of the hot water enters a first cosolvent groove, a second cosolvent groove, a third cosolvent groove, and a fourth cosolvent groove to generate a saturated cosolvent solution. The cosolvent solution generated by the first cosolvent groove and the cosolvent solution generated by the second cosolvent groove are mixed with the other portion of the hot water and enter a mineral generator to dissolve a natural ore in the mineral generator, and then are mixed with the cosolvent solution generated by the third cosolvent groove and the cosolvent solution generated by the fourth cosolvent groove, so that a hot spring water is formed and is outputted.

As the saturated cosolvent solutions flow in a pipeline of the aforementioned hot spring generator and dissolve minerals of the natural ore in the mineral generator, different minerals and different solutions are interacted with one another and are joined in the mineral generator to be mixed, and then the hot spring water is outputted. As a result, crystals formed by the different minerals and chemical substances are attached to different positions of an inner wall of the pipeline of the hot spring generator, thereby blocking the water flow or even causing the hot spring generator to malfunction. Besides, the different solutions simultaneously mixed at a position can cause a chemical reaction to generate unexpected chemical substances, thereby making the hot spring water outputted change in quality or ineffective.

BRIEF SUMMARY OF THE INVENTION

In view of the above, the primary objective of the present invention is to provide a device, which could generate a mineral spring for personal, domestic, commercial, or industrial uses, wherein the structure of the device could prevent unexpected chemical reactions due to a solute of different concentrates being mixed at a position, and crystals are not easily formed in a pipeline to be attached to a tubular wall of the pipeline, thereby preventing blockage of the pipeline.

The present invention provides a mineral spring generator including a machine body, a pipeline structure, at least two material containers, and a programmable controller. The pipeline structure includes a pipeline and at least two injection channels that are disposed in the machine body, wherein two ends of the pipeline respectively have a water inlet and a water outlet. A solenoid valve is connected between the pipeline. Each of the at least two injection channels has an inner end, an outer end, and a micromotor connected between the inner end and the outer end. The inner ends of the at least two injection channels are connected to the pipeline at intervals along a direction of a water flow in the pipeline. The at least two material containers are disposed in the machine body and are respectively connected to the outer end of one of the at least two injection channels, wherein each of the at least two material containers is filled with a mineral spring concentrate. The programmable controller is disposed in the machine body and electrically controls the solenoid valve and the micromotors of the at least two injection channels to respectively add the mineral spring concentrates in the at least two material containers to different positions of the pipeline.

When the present invention is used, a water source is inputted to the pipeline by the water inlet. Then the programmable controller opens the solenoid valve to make a water flow to flow rearward from a first section of the pipeline. At that time, the programmable controller controls the micromotors to operate to add the mineral spring concentrates in the at least two material containers with a predetermined addition amount to the different positions of the pipeline at times intervals or simultaneously. Finally, mineral spring, cold spring, or hot spring could be obtained through the water outlet for different uses or drinking. The present invention could change the water source into mineral spring, cold spring, or hot spring to satisfy personal, domestic, commercial, or industrial uses.

With the aforementioned design, the mineral spring concentrates are added to the different position of the pipeline to be mixed with the water flow, so that chemical reactions or formation of new chemical substances due to the mineral spring concentrates being mixed could be prevented, thereby preventing the blockage in the pipeline structure or the change in quality of the mineral spring.

The present invention further sets each of the mineral spring concentrates to be a liquid fluid having a solute, so that chemical changes due to different solutes being mixed in the same material container in advance could be prevented, thereby preventing the blockage of the pipeline due to the formation of the crystals. The present invention further sets a saturation concentration of the mineral spring concentrate in each of the material containers of the mineral spring generator at an environmental temperature to be smaller than a concentration of being supersaturated, so that the mineral spring concentrate in each of the material containers would not naturally cause the formation of the crystals during storage. Besides, the saturation concentration increases with a temperature. Thus, when the mineral spring concentrate of the material container is used in the mineral spring generator, the formation of the crystals could be prevented as the water source inputted mainly is a water at the environmental temperature or a hot water, thereby conducive to preventing the blockage of the pipeline structure.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
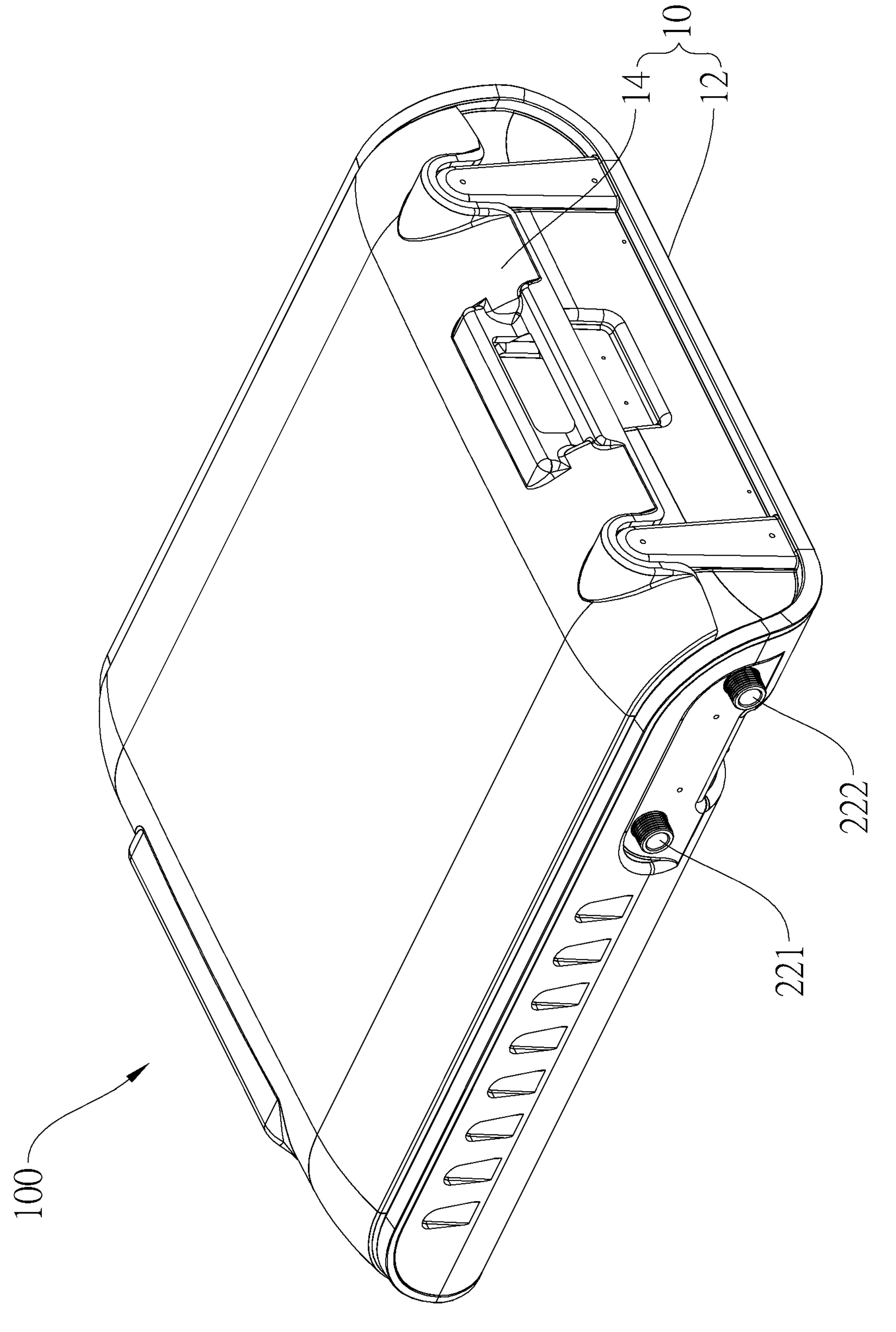
FIG. 1 is a perspective view of the mineral spring generator according to an embodiment of the present invention.

In the description below, the terms "top", "bottom", "front", "rear", "left", "right", and their derivatives, should be interpreted from the exploded view of the present invention in FIG. 2. It is also understood that the terminology used herein is for the purpose of describing particular embodiments only, and is not intended to limit the scope of the present invention. A mineral spring generator 100 according to an embodiment of the present invention is illustrated in FIG. 1 to FIG. 4 and includes a machine body 10, a pipeline structure 20, a plurality of material containers 30, and a programmable controller 40.

Figure 2:
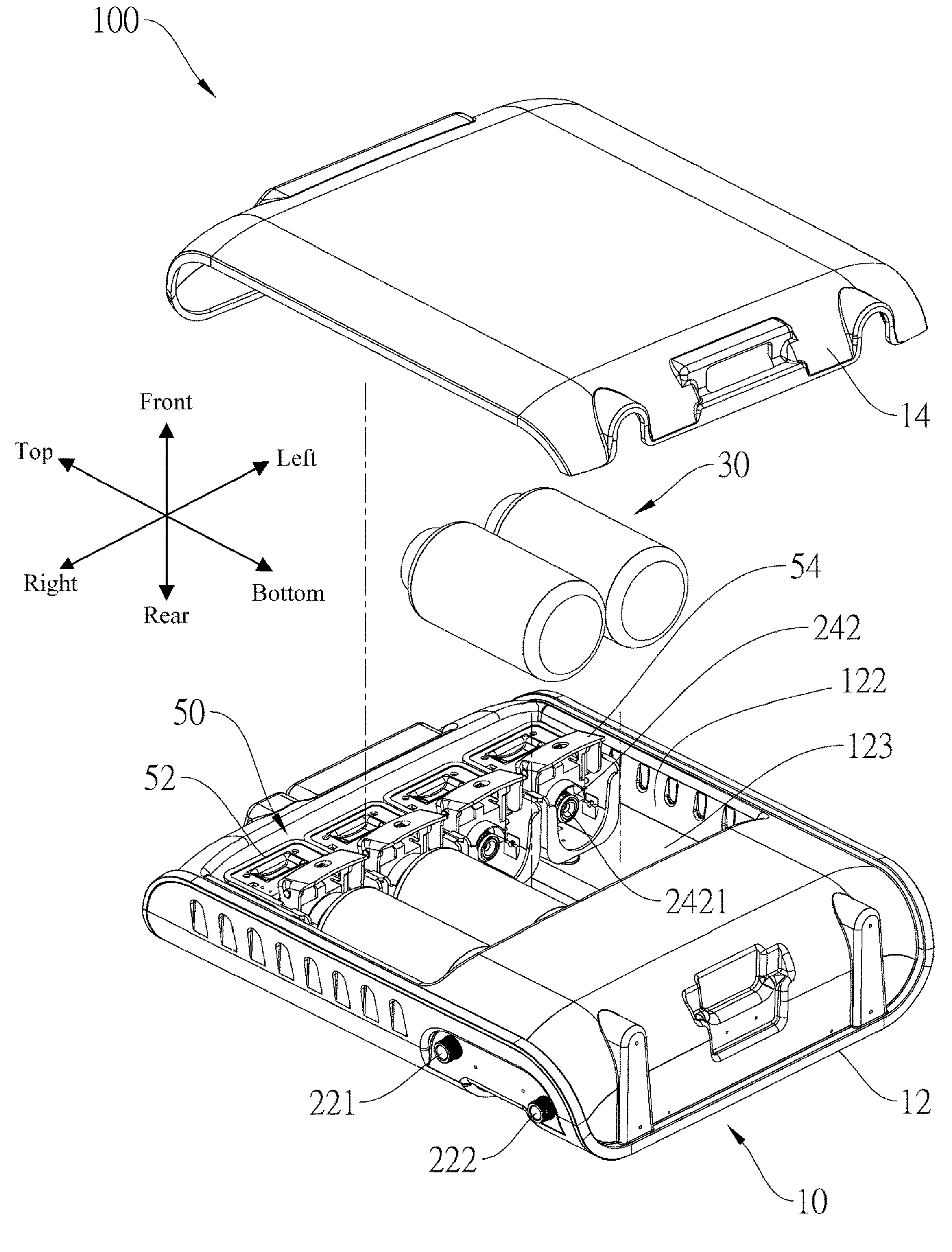
FIG. 2 is a perspective view, showing the cover and the two material containers being separated from the mineral spring generator shown in FIG. 1.
Figure 4:
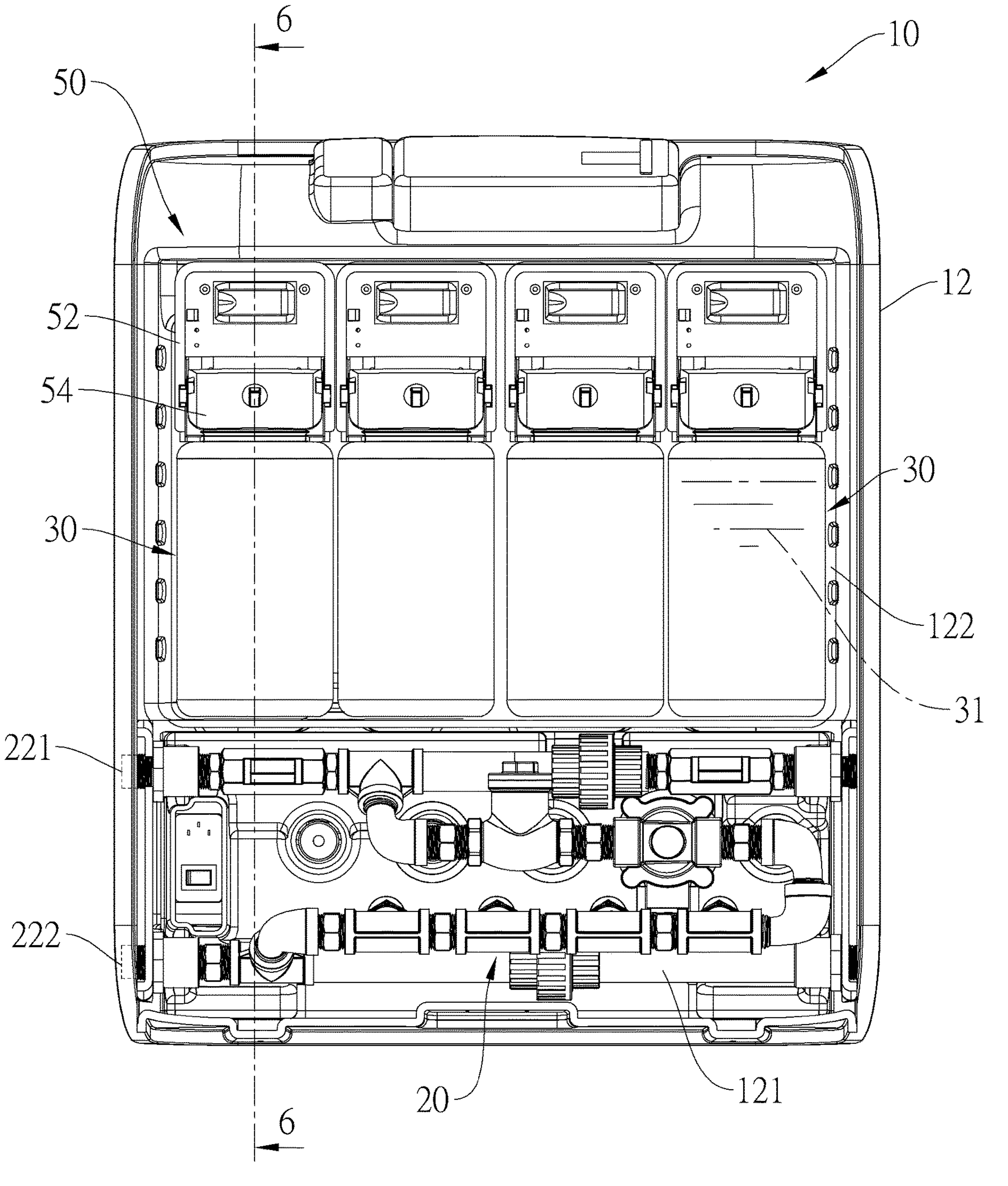
FIG. 4 is a front schematic view, showing a section of a part of the mineral spring generator according to the embodiment of the present invention.

As shown in FIG. 2 and FIG. 4, the machine body 10 has a pipeline receiving portion 121 and a bottle receiving room 122. In the current embodiment, the pipeline receiving portion 121 and the bottle receiving room 122 are located inside the machine body 10. In other embodiments, the pipeline receiving portion 121 and the bottle receiving room 122 could be opened or be partially exposed out of a surface of the machine body 10; for example, the bottle receiving room 122 could be a recessing groove opening outward.

The pipeline structure 20 is disposed in the pipeline receiving portion 121 of the machine body 10 and includes a pipeline 22 and at least two injection channels 24. Two opposite ends of the pipeline 22 respectively has a water inlet 221 and a water outlet 222. A solenoid valve 26 is connected between the pipeline 22 and divides the pipeline 22 into a first section A and a second section B, wherein the first section A is a side of the pipeline 22 close to the water inlet 221, and the second section B is a side of the pipeline 22 close to the water outlet 222. Each of the at least two injection channels 24 has an inner end, an outer end, and a micromotor 241 connected between the inner end and the outer end. In the current embodiment, the inner ends the injection channels 24 are connected to the second section B of the pipeline 22 at intervals along a direction of a water flow in the pipeline 22. In other embodiments, the inner ends of the injection channels 24 could be changed to be connected to the first section A of the pipeline 22; also the inner end of a part of the injection channels 24 could be connected to the first section A of the pipeline 22 at intervals, and the inner ends of the other injection channels 24 could be connected to the second section B of the pipeline 22 at intervals.

Figure 3:
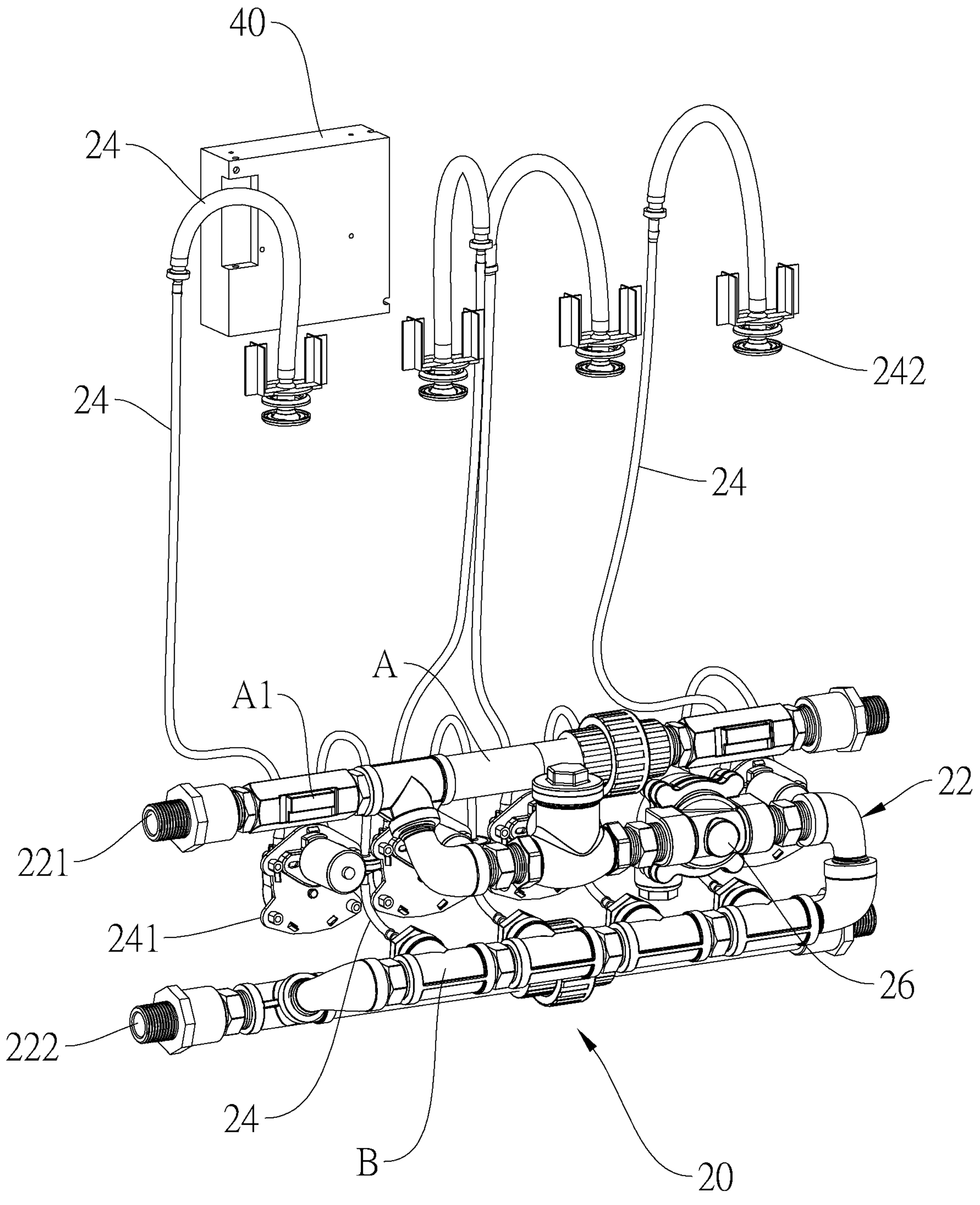
FIG. 3 is a perspective view of the pipeline structure and the programmable controller according to the embodiment of the present invention.
Figure 6:
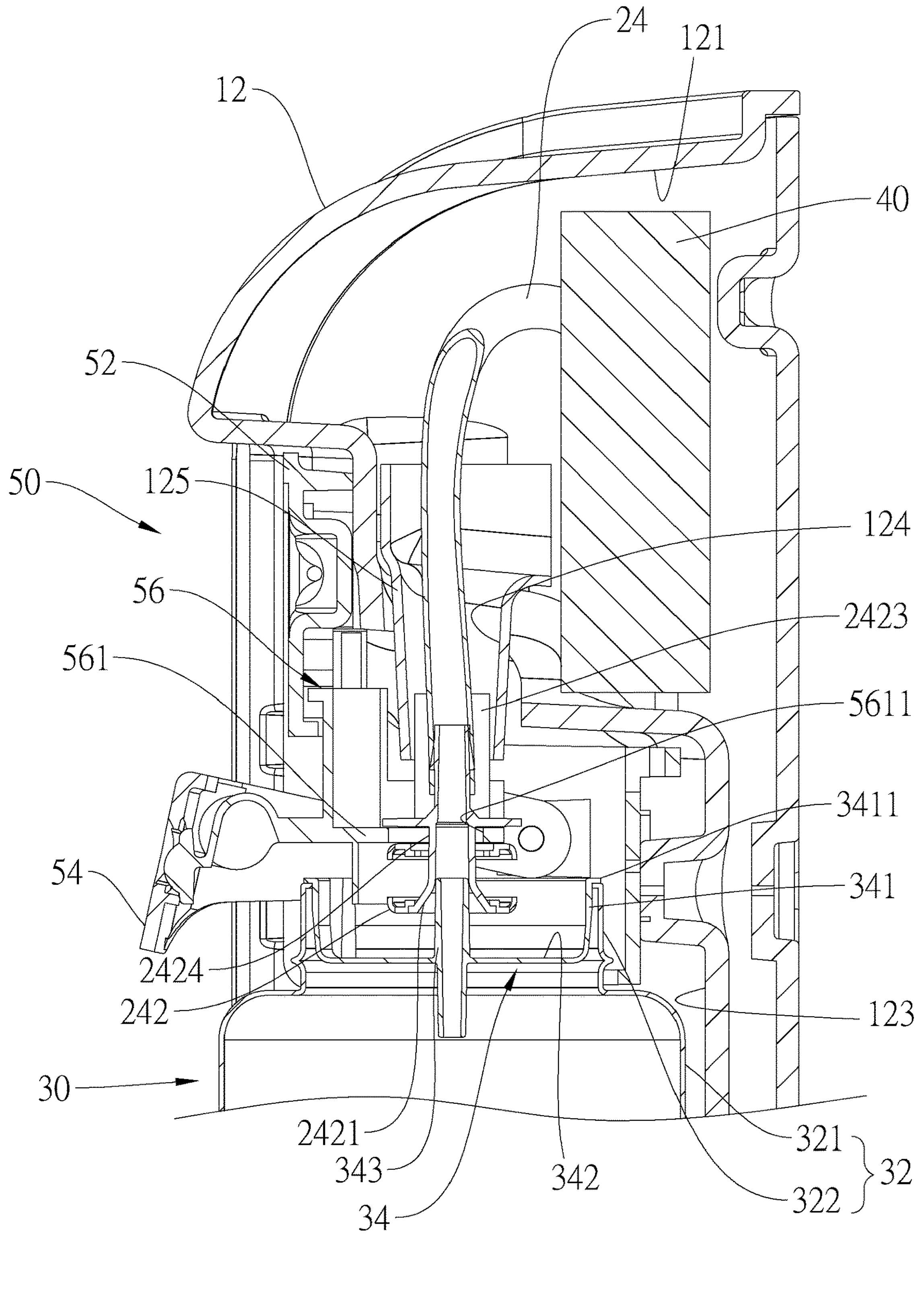
FIG. 6 is a sectional view along the 6-6 line in FIG. 4, showing the top portion of the case.

As shown in FIG. 3 and FIG. 6, the plurality of material containers 30 are disposed in the bottle receiving room 122 of the machine body 10. The plurality of material containers 30 include at least two material containers 30. In the current embodiment, the plurality of material containers 30 include four material containers 30 as an example. The material containers 30 are respectively connected to the outer end of one of the injection channels 24. The material container 30 is filled with a mineral spring concentrate 31, wherein the mineral spring concentrate 31 is a liquid fluid. In the current embodiment, each of the material containers 30 is detachably connected to the outer end of one of the injection channels 24, so that the material containers 30 having no mineral spring concentrate 31 could be removed from the bottle receiving room 122 and be replaced, or the material containers 30 could be changed to material containers 30 having different mineral spring concentrates 31, thereby adjusting a formula of the mineral spring concentrates 31 of the material containers 30 being added to the second section B.

As shown in FIG. 3, FIG. 4, and FIG. 6, the programmable controller 40 is disposed in the machine body 10. The programmable controller 40 is electrically connected to the solenoid valve 26 and the micromotors 241 of the injection channels 24 to electrically control the solenoid valve 26 the micromotors 241 of the injection channels 24. The programmable controller 40 activates the micromotors 241 to respectively add the mineral spring concentrates 31 in the material containers 30 to different positions of the pipeline 22. As a time of each of the micromotors 241 being activated is directly proportional to a flow rate passing through the corresponding one of the injection channels 24, an addition amount of each of the mineral spring concentrates 31 added to the pipeline 22 could be precisely controlled according to the time of the corresponding micromotor 241 being activated by the programmable controller 40.

In the embodiment shown in FIG. 2 and FIG. 3, when the mineral spring generator 100 of the present invention is used, a water source at a required temperature, for example a water at an environmental temperature or a hot water, is inputted through the water inlet 221 based on the need. After the water flow enters the pipeline 22, the programmable controller 40 opens the solenoid valve 26, so that the water flow flows from the first section A to the second section B. When the water flow flows through the second section B, the programmable controller 40 controls the micromotors 241 to operate, so that the mineral spring concentrates 31 of the material containers 30 could be correspondingly added to the different positions of the second section B of the pipeline 22. Eventually a mineral spring required could be obtained through the water outlet 222 for drinking or uses of cold spring or hot spring, thereby satisfying the need of mineral spring, cold spring, or hot spring in personal, domestic, or industrial uses.

As the mineral spring concentrates 31 are added to the different positions of the pipeline 22 to be mixed with the water flow flowing through the pipeline 22, different mineral spring concentrates 31 could not be easily mixed to cause unexpected chemical reactions, so that crystals could not be easily formed in the pipeline 22, thereby preventing the blockage of the pipeline structure 20 and preventing the change of quality of the mineral spring.

In order to prevent the formation of the crystals from the mineral spring concentrates 31 to block the water flow in the pipeline structure 20, a saturation concentration of the mineral spring concentrate 31 in each of the material containers 30 of the mineral spring generator 100 at the environmental temperature is set to be smaller than a concentration of the mineral spring concentrate 31 being supersaturated based on the environmental temperature of the mineral spring generator 100 being used. More specifically, the saturation concentration of each of the mineral spring concentrates 31 could be adjusted according to the relationship between the saturation concentration of the corresponding mineral spring concentrate 31 and a temperature. Different solutes have different solubilities at different temperatures. The higher the temperature, the higher the solubility, and vice versa.

When the environmental temperature is lowered, the solubility of the solute is reduced, thereby releasing the solute and forming the crystals. The present invention controls the increase and decrease of the solubility and the formation of the crystals to prevent the blockage of the pipeline structure 20 based on the relationship between the solubility and the environmental temperature, so that the mineral spring concentrate 31 in each of the material containers 30 would not naturally cause the formation of the crystals during storage. Additionally, as the mineral spring concentrate 31 is then mixed with the water source at the environmental temperature or the hot water, which increases the saturation concentration, the mineral spring concentrate 31 does not cause the formation of the crystals upon being mixed with the water source at the environmental temperature or the hot water.

In order to prevent the mineral spring concentrates 31 added to the pipeline 22 from being mixed in a same material container 30 or being mixed in the pipeline 22 to cause chemical reactions, each of the mineral spring concentrates 31 is a liquid fluid having a solute. The solute could be sodium chloride, calcium carbonate, magnesium carbonate, zinc carbonate, sodium hydrogen carbonate, or other common substances dissolving in the hot spring or the mineral spring. As each of the mineral spring concentrates 31 is a liquid fluid having only one solute, chemical changes due to two or more solutes being mixed in advance could be prevented. Additionally, a fixed period and time could be determined in the programmable controller 40 to control each of the micromotors 241 to add the corresponding mineral spring concentrate 31 to the pipeline 22, for example the second section B of the pipeline 22.

The programmable controller 40 could also be configured to control the micromotors 241 to add the mineral spring concentrates 31 of the material containers 30 to the second section B at time intervals while a certain amount of the water flow passes through the pipeline 22, so that the mineral spring concentrates 31 could be prevented from being mixed and a content of the mineral spring, cold spring, or hot spring outputted by the water outlet 222 could be stably maintained. More specifically, as an amount of the water flow passing through the pipeline 22 is directly proportional to time, the programmable controller 40 could control the time of each of the micromotors 241 operating in an addition session, so that the addition amount of each of the mineral spring concentrates 31 outputted to the second section B in the addition session could be adjusted, and a concentration of each of the mineral spring concentrates 31 in the mineral spring, the cold spring, or the hot spring, outputted by the water outlet 222 could be adjusted.

As shown in FIG. 3, a water detecting switch A1 could be connected between the first section A of the pipeline 22. The water detecting switch A1 is electrically connected to the programmable controller 40. When the water inlet 221 is connected to a supply line of the water at the environmental temperature or a hot water supply line and the water flow passes through the first section A to trigger the water detecting switch A1, the programmable controller 40 controls the solenoid valve 26 to open and simultaneously controls the micromotors 241 to operate, so that the mineral spring generator 100 could be controlled to operate by the water flow being inputted through the water inlet 221 without manual control, thereby continuously generating the mineral spring or the hot spring by the mineral spring generator 100.

The mineral spring generator 100 according to the embodiment of the present invention could continuously operate that the mineral spring concentrate 31 could be supplied or changed by replacing the material containers 30. Such technical feature is illustrated in the below description.

Figure 5:
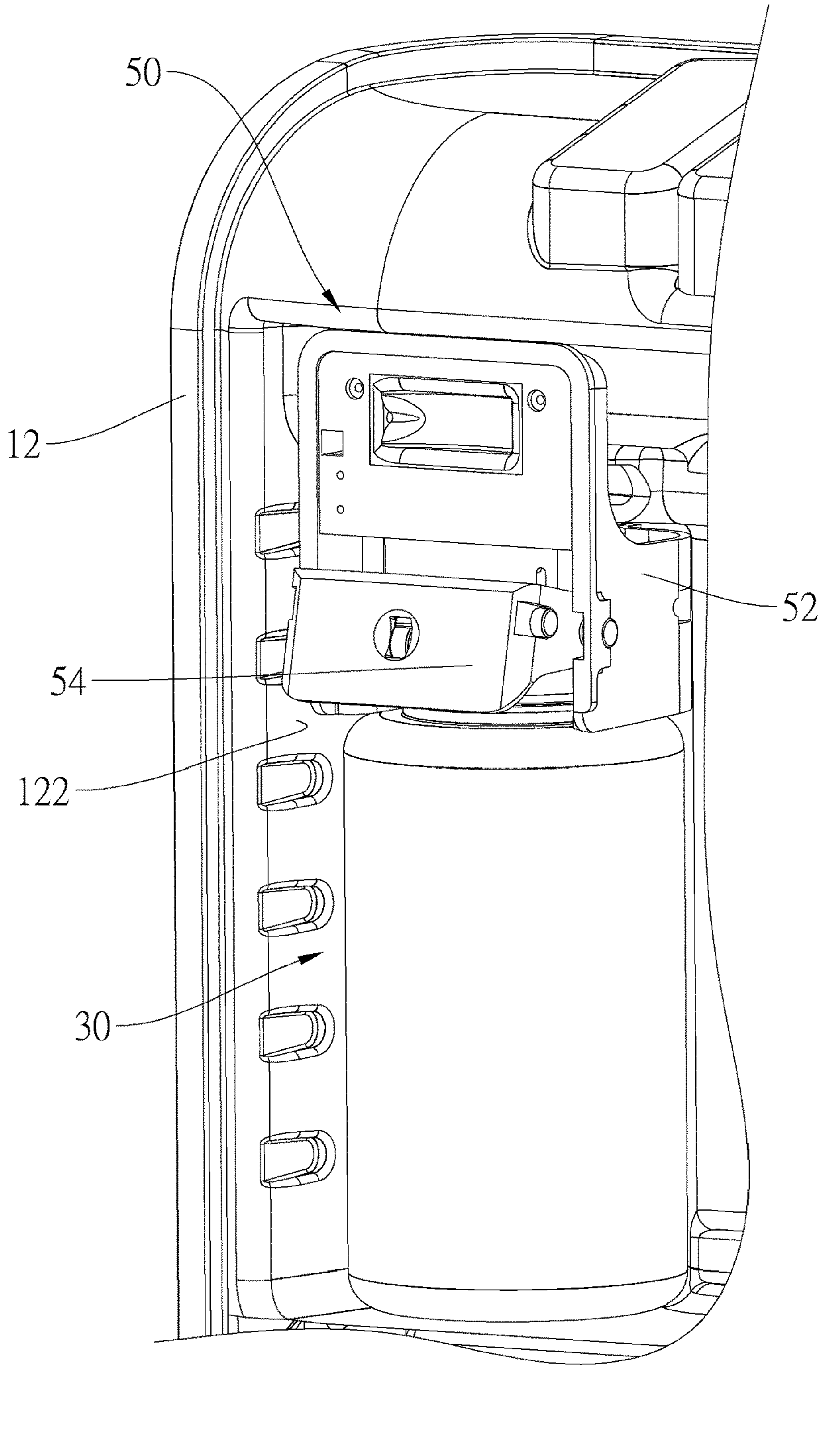
FIG. 5 is a partially enlarged perspective view, showing a part of the case according to the embodiment of the present invention.
Figure 7:
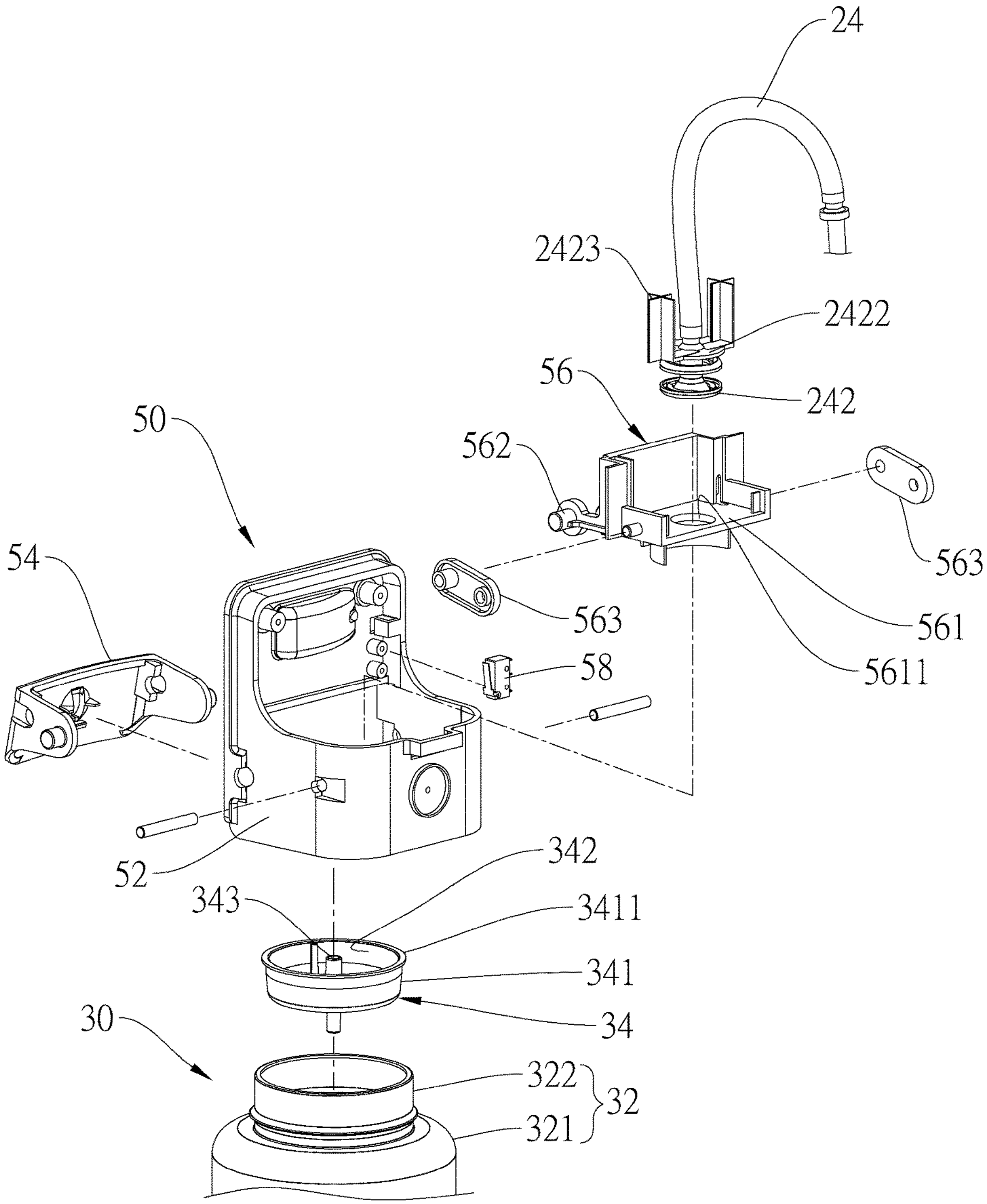
FIG. 7 is an exploded view of the container connecting structure according to the embodiment of the present invention.

As shown in FIG. 5 to FIG. 7, each of the material containers 30 includes a bottle 32 and a suction tube assembly 34. The bottle 32 has a body 321 and a neck 322 connected to a top end of the body 321. The suction tube assembly 34 has a suction tube 343 and a cap 341 that is in bowl-like shape, wherein an inner side of the cap 341 has a recess 342, and a peripheral edge of a top end of the cap 341 has a flange 3411. The cap 341 fits in the neck 322 of the bottle 32, and the flange 3411 of the cap 341 abuts against a top edge of the neck 322 of the bottle 32 for positioning. The suction tube 343 is engaged with a middle of the cap 341 along a top-bottom direction, wherein at least a part of the suction tube 343 is located in the recess 342, and a bottom end of the suction tube 343 communicates with the bottle 32. The outer end of each of the injection channels 24 is engaged with a sleeve 242 matching with the suction tube 343, wherein the sleeve 242 has a fitting opening 2421 that is bell-shaped. The fitting opening 2421 fits around a top end of the suction tube 343. Each of the injection channels 24 extracts the mineral spring concentrate 31 in the bottle 32 of one of the material containers 30 thought the corresponding suction tube 343.

As the suction tube assembly 34 of the present invention is detachably engaged with the neck 322 of the bottle 32, the suction tube assembly 34 could be connected to different bottles having structure the same as the neck 322 of the bottle 32, so that the present invention could use bottles in common specification in the market without additionally manufacturing the bottle 32 by molding, thereby saving cost on manufacturing molding tools of the bottle 32.

As shown in FIG. 2 to FIG. 7, the machine body 10 includes a case 12 and a cover 14 detachably engaged with a front surface of the case 12. The pipeline receiving portion 121 is disposed in the case 12, so that the pipeline structure 20 disposed in the pipeline receiving portion 121 is located in the case 12. The water inlet 221 and the water outlet 222 are disposed on a surface of the case 12. The bottle receiving room 122 is formed by recessing into a surface of a front side of the case 12. The cover 14 closes a front side of the bottle receiving room 122. A plurality of bottle grooves 123 respectively matching with a shape of one of the material containers 30 is formed on a rear side of the bottle receiving room 122. Each of the bottle grooves 123 is a recessing groove with a shape of a rear surface matching with a side of an outer peripheral surface of one of the material containers 30. Each of the bottle grooves 123 has a top end and a bottom end, wherein the top end of each of the bottle grooves 123 has an injection hole 124. A periphery of the injection hole 124 forms a tubing base 125. A top end of the injection hole 124 communicates with the case 12. Each of the injection channels 24 is a hose, wherein the outer end of each of the injection channels 24 passes through the case 12 to the injection hole 124 of one of the bottle grooves 123 to enter the corresponding bottle groove 123.

Each of the material containers 30 is placed in one of the bottle grooves 123 for positioning, and a rear side of each of the material containers 30 abuts against the rear surface of one of the bottle grooves 123 for fixing. When the suction tube 343 of a top end of each of the material containers 30 is engaged with the fitting opening 2421 of the sleeve 242 of one of the injection channels 24, each of the injection channels 24 is connected to one of the material containers 30 to extract the mineral spring concentrate 31 in the bottle 32 of the corresponding material container 30.

A top side of each of the bottle groove 123 is engaged with a container connecting structure 50. As shown in FIG. 4 to FIG. 8A, each of the container connecting structures 50 has a connecting base 52 fixed at a periphery of the tubing base 125, wherein the connecting base 52 is a frame having a left side surface and a right side surface. A front side of the left side surface and the right side surface of the connecting base 52 are pivotally connected to a locking assembly 54 protruding frontward along a front-rear direction. A liftable base 56 is disposed in the connecting base 52. The liftable base 56 is located directly below the tubing base 125 and has a bottom frame 561, wherein a middle of the bottom frame 561 has a positioning hole 5611. The sleeve 242 is a plastic hose that is elastic and deformable, wherein a part of a periphery of the sleeve 242 forms a neck 2424. The sleeve 242 is inserted into the positioning hole 5611, so that the neck 2424 of the sleeve 242 passes through the positioning hole 5611 to be fixed on the bottom frame 561 of the liftable base 56. An outer diameter of the neck 2424 of the sleeve 242 is smaller than a diameter of the positioning hole 5611, so that the sleeve 242 is movable relative to the bottom frame 561 in the positioning hole 5611 along the front-rear direction. Another part of the periphery of the sleeve 242 is engaged with a guiding assembly 2422. A left side and a right side of the guiding assembly 2422 respectively has a guiding rod 2423, wherein the two guiding rods 2423 are both a rod extending along the top-bottom direction, and respectively pass through a left side and a right side of the injection hole 124 in a slidable way along the top-bottom direction, so that the liftable base 56 fitting around the periphery of the sleeve 242 could be restricted to lift or decline along the top-bottom direction and to move along the front-bottom direction within the connecting base 52.

Two extending arms 562 extend frontward along the front-rear direction and respectively extend frontward out of a left side and a right side of a front end of the bottom frame 561. Two swinging arms 563 extend rearward along the front-rear direction. A left side and a right side of the bottom frame 561 are respectively and pivotally connected to one of the two swinging arms 563. A rear side of the left side surface and the right side surface of the connecting base 52 are respectively and pivotally connected to a rear end of one of the two swinging arms 563. A front end of each of the two extending arms 562 is pivotally connected to a front side of the locking assembly 54. A micro switch 58 is disposed on the connecting base 52 and is electrically connected to the programmable controller 40. The micro switch 58 is located on a front side of the liftable base 56. When the liftable base 56 lifts or declines, a front end of the liftable base 56 could trigger the micro switch 58, so that the programmable controller 40 could recognize whether the connecting base 52 is located at a lifted position or at a declined position based on a triggering status of the micro switch 58.

Figure 8A:
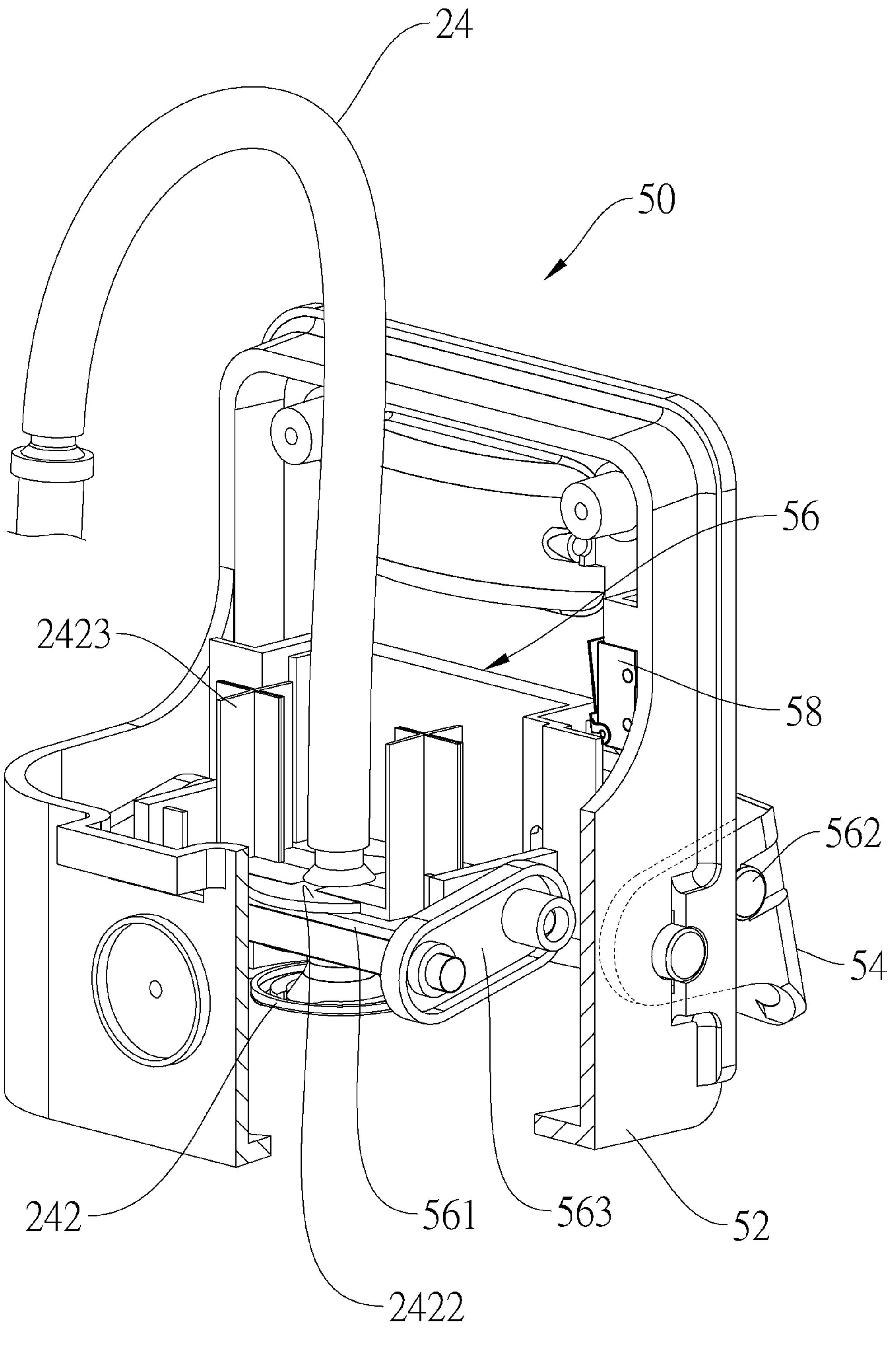
FIG. 8A is a schematic view, showing a section of a part of the container connecting structure according to the embodiment of the present invention.
Figure 8B:
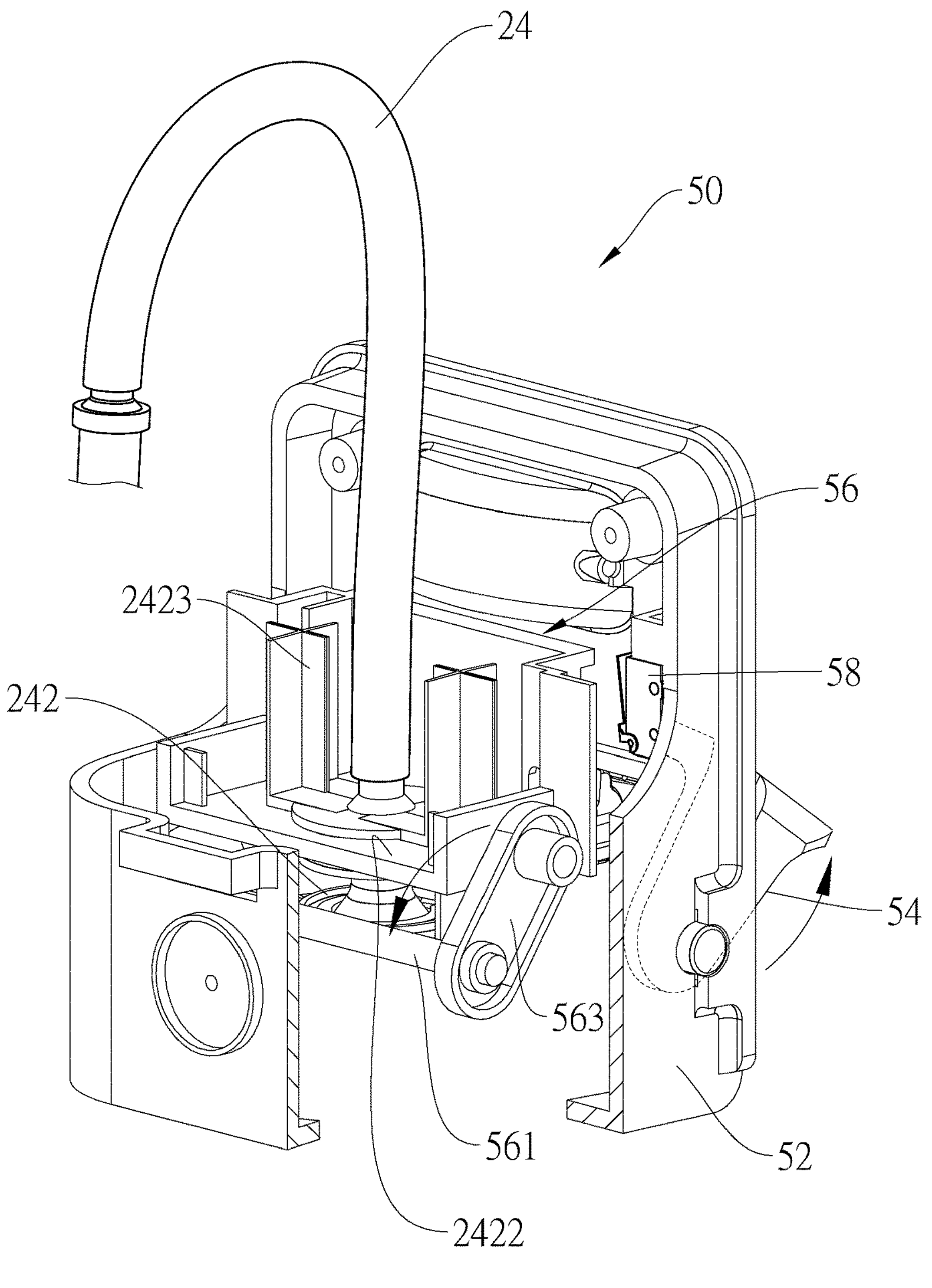
FIG. 8B is a schematic view, showing the liftable base and the sleeve in FIG. 8A are lifted.

Referring to FIG. 8A and FIG. 8B, when the locking assembly 54 pivots downward or upward, the pivoting motion of the locking assembly 54 could drive the liftable base 56 and the bottom frame 561 of the liftable base 56 to move within the connecting base 52 along the top-bottom direction. When the locking assembly 54 pivots downward to a dead center, the sleeve 242 declines along with the bottom frame 561 to a position that the fitting opening 2421 could fit around a periphery of the suction tube 343; at that time, a bottom end of the sleeve 242 urges the cap 341 to fix the material container in the corresponding bottle groove 123. When the locking assembly 54 pivots upward to lift the liftable base 56 and the bottom frame 561 of the liftable base 56, the sleeve 242 is detached from the suction tube assembly 34 of the material container 30, so that the material container 30 could be removed from the corresponding bottle groove 123 for replacing.

It must be pointed out that the embodiments described above are only some preferred embodiments of the present invention. All equivalent structures which employ the concepts disclosed in this specification and the appended claims should fall within the scope of the present invention.

What is claimed is:

1. A mineral spring generator, comprising:

a machine body;

a pipeline structure comprising a pipeline and at least two injection channels that are disposed in the machine body, wherein two ends of the pipeline respectively have a water inlet and a water outlet; a solenoid valve is connected between the pipeline; each of the at least two injection channels has an inner end, an outer end, and a micromotor connected between the inner end and the outer end; the inner ends of the at least two injection channels are connected to the pipeline at intervals along a direction of a water flow in the pipeline;

at least two material containers disposed in the machine body and respectively connected to the outer end of one of the at least two injection channels, wherein each of the at least two material containers is filled with a mineral spring concentrate; and a programmable controller disposed in the machine body and electrically controlling the solenoid valve and the micromotors of the at least two injection channels to respectively add the mineral spring concentrates in the at least two material containers to different positions of the pipeline, wherein the machine body comprises a case; a bottle receiving room is formed by recessing into a surface of a front side of the case; the at least two material containers are disposed in the bottle receiving room, and wherein each of the at least two material containers comprises a bottle and a suction tube assembly; the bottle has a neck; the suction tube assembly has a cap and a suction tube, wherein a peripheral edge of a top end of the cap has a flange; the cap fits in the neck of the bottle, and the flange abuts against a top edge of the neck of the bottle for positioning; the suction tube is engaged with a middle of the cap, wherein a bottom end of the suction tube communicates with the bottle; the outer end of each of the at least two injection channels is engaged with a sleeve fitting around the suction tube.

2. The mineral spring generator as claimed in claim 1, wherein a saturation concentration of each of the mineral spring concentrates at an environmental temperature is smaller than a concentration of being supersaturated to reduce or prevent a formation of crystals.

3. The mineral spring generator as claimed in claim 2, wherein each of the mineral spring concentrates is a liquid fluid having a solute; the solute is sodium chloride, calcium carbonate, magnesium carbonate, zinc carbonate, or sodium hydrogen carbonate.

4. The mineral spring generator as claimed in claim 1, wherein the programmable controller controls the micromotors to add the mineral spring concentrates in the at least two material containers to the pipeline at time intervals.

5. The mineral spring generator as claimed in claim 4, wherein the programmable controller controls a time of each of the micromotors operating in an addition session to correspondingly adjust an addition amount of one of the mineral spring concentrates added to the pipeline and the water outlet in the addition session.

6. A mineral spring generator, comprising:

a machine body;

a pipeline structure comprising a pipeline and at least two injection channels that are disposed in the machine body, wherein two ends of the pipeline respectively have a water inlet and a water outlet; a solenoid valve is connected between the pipeline; each of the at least two injection channels has an inner end, an outer end, and a micromotor connected between the inner end and the outer end; the inner ends of the at least two injection channels are connected to the pipeline at intervals along a direction of a water flow in the pipeline;

at least two material containers disposed in the machine body and respectively connected to the outer end of one of the at least two injection channels, wherein each of the at least two material containers is filled with a mineral spring concentrate; and a programmable controller disposed in the machine body and electrically controlling the solenoid valve and the micromotors of the at least two injection channels to respectively add the mineral spring concentrates in the at least two material containers to different positions of the pipeline, wherein the machine body comprises a case; a bottle receiving room is formed by recessing into a surface of a front side of the case; the at least two material containers are disposed in the bottle receiving room, and wherein the pipeline structure is disposed in the case; the bottle receiving room has at least two bottle grooves, wherein each of the at least two bottle grooves has a bottom end and a top end having an injection hole; a top end of the injection hole communicates with the case; the outer end of each of the at least two injection channels passes through the injection hole of one of the at least two bottle grooves and is engaged with a sleeve; each of the at least two material containers is disposed in one of the at least two bottle grooves; a top end of each of the at least two material containers has a suction tube; the sleeve of each of the at least two injection channels fits around the suction tube of one of the at least two material containers, so that each of the at least two injection channels is connected to one of the at least two material containers.

7. The mineral spring generator as claimed in claim 6, wherein a saturation concentration of each of the mineral spring concentrates at an environmental temperature is smaller than a concentration of being supersaturated to reduce or prevent a formation of crystals.

8. The mineral spring generator as claimed in claim 7, wherein each of the mineral spring concentrates is a liquid fluid having a solute; the solute is sodium chloride, calcium carbonate, magnesium carbonate, zinc carbonate, or sodium hydrogen carbonate.

9. The mineral spring generator as claimed in claim 6, wherein the programmable controller controls the micromotors to add the mineral spring concentrates in the at least two material containers to the pipeline at time intervals.

10. The mineral spring generator as claimed in claim 9, wherein the programmable controller controls a time of each of the micromotors operating in an addition session to correspondingly adjust an addition amount of one of the mineral spring concentrates added to the pipeline and the water outlet in the addition session.

11. The mineral spring generator as claimed in claim 6, wherein a connecting base is fixed on a top side of each of the at least two bottle grooves; a front side of the connecting base is pivotally connected to a locking assembly protruding frontward along a front-rear direction; a liftable base is disposed in the connecting base and is restricted to be not rotatable relative to the connecting base; the liftable base has a bottom frame; two extending arms extend along the front-rear direction and respectively extend frontward out of a left side and a right side of a front end of the bottom frame; two swinging arms extend rearward along the front-rear direction; a left side and a right side of the bottom frame are respectively and pivotally connected one of the two swinging arms; a rear end of each of the two swinging arms is pivotally connected to the connecting base; a front end of each of the two extending arms is pivotally connected to a front side of the locking assembly; the bottom frame is engaged with the sleeve of one of the at least two injection channels.

12. The mineral spring generator as claimed in claim 7, wherein a connecting base is fixed on a top side of each of the at least two bottle grooves; a front side of the connecting base is pivotally connected to a locking assembly protruding frontward along a front-rear direction; a liftable base is disposed in the connecting base and is restricted to be not rotatable relative to the connecting base; the liftable base has a bottom frame; two extending arms extend along the front-rear direction and respectively extend frontward out of a left side and a right side of a front end of the bottom frame; two swinging arms extend rearward along the front-rear direction; a left side and a right side of the bottom frame are respectively and pivotally connected one of the two swinging arms; a rear end of each of the two swinging arms is pivotally connected to the connecting base; a front end of each of the two extending arms is pivotally connected to a front side of the locking assembly; the bottom frame is engaged with the sleeve of one of the at least two injection channels.

13. The mineral spring generator as claimed in claim 8, wherein a connecting base is fixed on a top side of each of the at least two bottle grooves; a front side of the connecting base is pivotally connected to a locking assembly protruding frontward along a front-rear direction; a liftable base is disposed in the connecting base and is restricted to be not rotatable relative to the connecting base; the liftable base has a bottom frame; two extending arms extend along the front-rear direction and respectively extend frontward out of a left side and a right side of a front end of the bottom frame; two swinging arms extend rearward along the front-rear direction; a left side and a right side of the bottom frame are respectively and pivotally connected one of the two swinging arms; a rear end of each of the two swinging arms is pivotally connected to the connecting base; a front end of each of the two extending arms is pivotally connected to a front side of the locking assembly; the bottom frame is engaged with the sleeve of one of the at least two injection channels.

14. The mineral spring generator as claimed in claim 9, wherein a connecting base is fixed on a top side of each of the at least two bottle grooves; a front side of the connecting base is pivotally connected to a locking assembly protruding frontward along a front-rear direction; a liftable base is disposed in the connecting base and is restricted to be not rotatable relative to the connecting base; the liftable base has a bottom frame; two extending arms extend along the front-rear direction and respectively extend frontward out of a left side and a right side of a front end of the bottom frame; two swinging arms extend rearward along the front-rear direction; a left side and a right side of the bottom frame are respectively and pivotally connected one of the two swinging arms; a rear end of each of the two swinging arms is pivotally connected to the connecting base; a front end of each of the two extending arms is pivotally connected to a front side of the locking assembly; the bottom frame is engaged with the sleeve of one of the at least two injection channels.

15. The mineral spring generator as claimed in claim 10, wherein a connecting base is fixed on a top side of each of the at least two bottle grooves; a front side of the connecting base is pivotally connected to a locking assembly protruding frontward along a front-rear direction; a liftable base is disposed in the connecting base and is restricted to be not rotatable relative to the connecting base; the liftable base has a bottom frame; two extending arms extend along the front-rear direction and respectively extend frontward out of a left side and a right side of a front end of the bottom frame; two swinging arms extend rearward along the front-rear direction; a left side and a right side of the bottom frame are respectively and pivotally connected one of the two swinging arms; a rear end of each of the two swinging arms is pivotally connected to the connecting base; a front end of each of the two extending arms is pivotally connected to a front side of the locking assembly; the bottom frame is engaged with the sleeve of one of the at least two injection channels.

16. The mineral spring generator as claimed in claim 11, wherein each of the at least two material containers comprises a bottle and a suction tube assembly; the bottle has a body and a neck connected to a top end of the body; the suction tube assembly has a cap, wherein a peripheral edge of a top end of the cap has a flange; the cap fits in the neck of the bottle, and the flange abuts against a top edge of the neck of the bottle for positioning; the suction tube is engaged with a middle of the cap; wherein at least a part of the suction tube is located on an inside of the cap, and a bottom end of the suction tube communicates with the bottle.

17. The mineral spring generator as claimed in claim 12, wherein each of the at least two material containers comprises a bottle and a suction tube assembly; the bottle has a body and a neck connected to a top end of the body; the suction tube assembly has a cap, wherein a peripheral edge of a top end of the cap has a flange; the cap fits in the neck of the bottle, and the flange abuts against a top edge of the neck of the bottle for positioning; the suction tube is engaged with a middle of the cap; wherein at least a part of the suction tube is located on an inside of the cap, and a bottom end of the suction tube communicates with the bottle.

18. The mineral spring generator as claimed in claim 13, wherein each of the at least two material containers comprises a bottle and a suction tube assembly; the bottle has a body and a neck connected to a top end of the body; the suction tube assembly has a cap, wherein a peripheral edge of a top end of the cap has a flange; the cap fits in the neck of the bottle, and the flange abuts against a top edge of the neck of the bottle for positioning; the suction tube is engaged with a middle of the cap; wherein at least a part of the suction tube is located on an inside of the cap, and a bottom end of the suction tube communicates with the bottle.

19. The mineral spring generator as claimed in claim 14, wherein each of the at least two material containers comprises a bottle and a suction tube assembly; the bottle has a body and a neck connected to a top end of the body; the suction tube assembly has a cap, wherein a peripheral edge of a top end of the cap has a flange; the cap fits in the neck of the bottle, and the flange abuts against a top edge of the neck of the bottle for positioning; the suction tube is engaged with a middle of the cap; wherein at least a part of the suction tube is located on an inside of the cap, and a bottom end of the suction tube communicates with the bottle.

20. The mineral spring generator as claimed in claim 15, wherein each of the at least two material containers comprises a bottle and a suction tube assembly; the bottle has a body and a neck connected to a top end of the body; the suction tube assembly has a cap, wherein a peripheral edge of a top end of the cap has a flange; the cap fits in the neck of the bottle, and the flange abuts against a top edge of the neck of the bottle for positioning; the suction tube is engaged with a middle of the cap; wherein at least a part of the suction tube is located on an inside of the cap, and a bottom end of the suction tube communicates with the bottle.

* * * * *